United States Patent [19]
Isaacs

[11] Patent Number: 6,033,705
[45] Date of Patent: Mar. 7, 2000

[54] METHOD FOR TREATING FOODSTUFFS TO REDUCE OR PREVENT MICROBIAL ACTIVITY

[76] Inventor: Charles E. Isaacs, 30 Devon Dr. North, Manalapan, N.J. 07726

[21] Appl. No.: 09/112,035

[22] Filed: Jul. 8, 1998

[51] Int. Cl.[7] .................................. A21D 4/00; A23L 3/34
[52] U.S. Cl. ........................ 426/323; 426/326; 426/335; 426/532; 426/589
[58] Field of Search ................................... 426/335, 532, 426/589, 326, 323

[56] References Cited

U.S. PATENT DOCUMENTS

| | | | |
|---|---|---|---|
| 4,342,789 | 8/1982 | Ueno et al. | 426/266 |
| 5,000,972 | 3/1991 | Nafisi-Movaghar | 426/333 |
| 5,434,182 | 7/1995 | Isaacs et al. | 514/546 |
| 5,490,992 | 2/1996 | Andrews | 426/606 |
| 5,573,797 | 11/1996 | Wilhoit | 426/108 |
| 5,573,801 | 11/1996 | Wilhoit | 426/326 |
| 5,616,353 | 4/1997 | Wright | 426/324 |
| 5,800,850 | 9/1998 | Clyde et al. | 426/45 |
| 5,869,113 | 2/1999 | Clayton et al. | 426/8 |

*Primary Examiner*—Nina Bhat
*Attorney, Agent, or Firm*—Pitney, Hardin, Kipp & Szuch, LLP

[57] ABSTRACT

A process for inhibiting microbial growth on a surface of an edible foodstuff which comprises applying to the surface an antimicrobially effective quantity of a compound selected from the group consisting of $C_4$–$C_{24}$ fatty acids and monoglycerides thereof, $C_6$–$C_{14}$ fatty alcohols, $C_{14}$–$C_{22}$ mono- or polyunsaturated fatty acids and monoglycerides thereof, $C_{16}$–$C_{20}$ mono- or polyunsaturated fatty alcohols, and ether and lysophos-phatidylcholine derivatives of $C_4$–$C_{22}$ fatty acids.

17 Claims, No Drawings

METHOD FOR TREATING FOODSTUFFS TO REDUCE OR PREVENT MICROBIAL ACTIVITY

BACKGROUND OF THE INVENTION

1. Field of the Invention

This invention relates to a method of treating foodstuffs to prevent microbial activity. More particularly, the invention relates to treating the surface of a foodstuff with an antimicrobialy effective amount of a compound to remove, retard of reduce microbial contamination and/or growth without causing substantial organoleptic depreciation of the foodstuff. In an alternative embodiment, the compound may be mixed with the foodstuff to retard or prevent microbial growth. The method may be employed with any foodstuff including meat, fish, vegetables, powdered meat and vegetable stocks, powdered milk, and mixtures thereof.

2. Brief Description of Related Art

"Food preservation", as that term is used herein, includes methods which guard against food poisoning as well as methods which delay or prevent food spoilage due to microbes. Food preservation keeps food safe for consumption and inhibits or prevents nutrient deterioration or organoleptic changes causing food to become less palatable.

"Food spoilage", as that term is used herein, includes any alteration in the condition of food which makes it less palatable including changes in taste, smell, texture or appearance. Spoiled food may or may not be toxic.

"Food poisoning", as that term is used herein, refers to mammalian disease caused by ingestion of food contaminated by pathogenic viruses, molds or bacteria and/or their toxins. Pathogen-contaminated food does not necessarily show any organoleptic sign of spoilage. For example, bacterial food poisoning may be caused by either infection of the host by the bacterial organism or by action of a toxin produced by the bacteria either in the food or in the host.

Prevention of food spoilage and food poisoning has been attempted throughout history often through trial and error. The early attempts have resulted in the adoption of such food preservation methods as the drying, salting and/or smoking of foods in order to preserve them. It has been relatively recent in recorded history that food preservation has been placed upon a scientific foundation. In the nineteenth century, work of such scientists as Louis Pasteur and Robert Koch elucidated the bacterial causes of food poisoning and spoilage and provided new methods of identifying pathogenic bacteria and of preserving food.

Present food technologists utilize an array of physical, chemical, and biological processes and agents to preserve food and prevent the transmission of disease via foodstuffs. In addition to such processes as irradiation, fermentation, pasteurization, control of temperature, pH and/or water activity, a plethora of chemical agents exist. These agents include antioxidants to prevent chemical degradation of food, as well as compounds which kill or inhibit deleterious bacteria and/or other microbes thereby preserving food i.e. preventing both spoilage and the transmission of disease. Commonly employed antimicrobial chemical agents include nitrites, nitrates, sulphur dioxide, sulfites, and acids such as acetic, propionic, lactic, benzoic, and sorbic acid and their salts, wood smoke and liquid smoke, and antibiotics such as natamycin and nisin.

Prevention of food poisoning is of paramount importance in the food processing industry. Concern for food safety has led most countries to heavily regulate the food industry to ensure public health. Also, manufacturers of processed food invest considerable resources to ensure the safety of their products. Despite these efforts, food poisoning still occurs. Many instances of food poisoning are attributed to bacteria such as Salmonella, Clostridium, and Staphylococcus among others.

Many people eat processed foods after a significant period of time has elapsed from a first cooking or pasteurization by the food manufacturer thereby permitting bacteria introduced by post-pasteurization contamination to grow. Since this food consumption may occur without reheating the processed food to sufficient temperatures for sufficient time to kill any microbes which may have been introduced subsequent to initial cooking, there is a risk of food poisoning. The present invention seeks to ameliorate the aforementioned risk.

This is a particular problem with ground meat. Meat, during and after slaughter, may contain or become contaminated with certain undesirable bacteria such as E. coli (especially E. coli 015:H7), Salmonella, Campylobacter, Listeria, spoilage bacteria, and the like. The meat is processed by removing the hide, eviscerating, cooling and cutting into larger cuts of fresh or cured meat. The fresh meat obtained after evisceration is chilled by hanging the sides of red meat at a temperature usually below 10° C. For example, beef is hung for a considerable period to allow natural enzymes to tenderize the beef. Pork is simply cooled. For certain primal cuts, such as ham, bacon, corned beef and pastrami the cuts are cured by chilling below 10° C. followed by injection of a solution containing salt, nitrite and/or nitrate, sweetener, cure accelerator, one or more polyphosphates, spices and flavorings. The meat is prepared to 105% to 130% of its weight with curing solution. Boxed meat is cut into primal cuts after chilling, vacuum packaged and boxed. In spite of such chilling and curing, microbial activity occurs during processing and after processing of the meat.

Various methods have been developed for preventing microbial activity in meat. For example, U.S. Pat. No. 5,268,185 teaches a process to retard bacterial growth by contacting surfaces with a solution of trialkali orthophosphate having a PH above 11.5.

Bynagte, U.S. Pat. No. 3,705,040 uses phosphates to help remove shrimp from their shells. Sodium orthophosphate at 2–15% with other ingredients can be employed.

Cheng, U.S. Pat. No. 4,683,139 teaches a process for prepackaged fresh meat at retail wherein the shelf life of the meat is increased by treatment with an aqueous solution of an alkali metal salt of certain phosphate compounds, a reducing compound such a ascorbic acid and a sequestering or chelating agent such as citric acid. The phosphate can be an orthophosphate, pyrophosphates, tripolyphosphates and hexametaphosphates.

Szezesniak et al., U.S. Pat. No. 4,075,357, teaches salt combined with a secondary salt selected from alkali metal salts of organic acids and trisodium orthophosphate, polyphosphate, metaphosphate and ultraphosphate. Citrates are preferably combined with sodium chloride. These mixtures are used to control water activity in intermediate moisture cooked food.

U.S. Pat. No. 5,374,433 discloses a method for preserving a food product comprising innoculating the food product with an effective amount of euthygienic, non-pathogenic, non-spoilage bacteria to inhibit the growth of undesired pathogenic and spoilage bacteria.

U.S. Pat. No. 4,247,569 discloses an antibacterial agent comprising one of straight chain saturated dicarboxylic acids or an alkali metal salt thereof or a mixture of 2 or more of said dicarboxylic acids or alkali metal salts thereof. The agent may be used in foodstuffs, such as milk and meat.

Kohl et al., U.S. Pat. No. 3,681,091 teaches treating foods including fish fillet with 10% solutions of medium chain length polyphosphates.

However, there is a disadvantage to the prior art products in that the application of some of these agents may cause alteration of the taste, texture and appearance of the food stuff. Furthermore, some of the treatments require delivery in the aqueous form. Therefore the treatments would not be suitable for use on foodstuffs which are on a powdered form such as a powdered milk, powdered gravy mix, powdered soup and stock mixes and other dehydrated foodstuffs such as fruits, vegetables, meats, and fish. Therefore, there is a need for a method to prevent antimicrobial activity which can be used in a non-aqueous form.

Additionally, many of the prior art treatment use materials which may be expensive and/or not readily available. Fatty acids and monoglycerides are readily available and may be formed during the breakdown of milk products, which is a relatively inexpensive product. Furthermore, while many compounds are able to destroy the envelope and inactivate the bacteria or virus, a large number have toxic side effects in the body. Fatty acids and monoglycerides are normal metabolites in the body, notably formed during the breakdown of milk products. The inventors have discovered that applying compounds comprising fatty acids and/or monoglycerides to the surface of foodstuffs successfully inhibits microbial activity.

SUMMARY OF THE INVENTION

It is an object of the invention to provide a novel process to prevent or inhibit microbial activity on the surface or interior of foodstuffs by applying a compound to the surface or mixing the compound with the foodstuff where possible.

Another object of the invention is to kill, inhibit or prevent the growth of pathogenic microorganisms on the surface of a foodstuff by transferring an antimicrobially effective amount of a compound to a surface of a foodstuff by means of a carrier film.

Another object of the invention is to transfer an antimicrobial compound to a foodstuff in an amount effective to prevent growth of pathogenic bacteria on the surface of the foodstuff after removal of the film for the normal shelf life of the foodstuff.

Other objects of the invention will be appreciated by those skilled in the art after reading the whole of the specification and the claims. The foregoing objects and others which will become apparent from that which follows may be achieved by treating a foodstuff, preferably a foodstuff surface, with a compound comprising $C_4$ to $C_{14}$ fatty acids and monoglycerides thereof and $C_{14}$ to $C_{22}$ mono- or polyunsaturated fatty acids and monoglycerides thereof, preferably from the group consisting of $C_6$–$C_{14}$ fatty acids and monoglycerides thereof, $C_6$–$C_{14}$ fatty alcohols, $C_{16}$–$C_{20}$ mono- or polyunsaturated fatty acids and monoglycerides thereof, $C_{16}$–$C_{20}$ mono- or polyunsaturated fatty alcohols, and ether and lysophosphatidylcholine derivatives of $C_4$–$C_{22}$ fatty acids to inhibit the growth of microorganisms.

Treatment may be by any suitable means such as spraying, dipping or mixing. The process may be implemented as, for example, a separate dip after chilling or a wash before chilling, freezing or dehydrating. Alternatively, the present process may be used a part of either the chilling process or as part of the scalding process. The flexibility to be used in these various processes and the ability to be effective at either cold or hot temperatures which are used in known food processing plants is particularly desirable.

Treatment may also be accomplished by contacting the foodstuff with a film containing the compound. The film may hold the compound in contact with the foodstuff surface thereby transferring a antimicrobially effective amount of the compound from the film to the surface of the foodstuff or it may transfer the compound (with or without use of a transfer agent) to the foodstuff whereby the film may be removed with the transferred compound remaining on the foodstuff surface in an antimicrobially effective amount to kill, prevent or inhibit growth of either food spoilage organisms or pathogenic microorganisms.

The method may be also be performed adding the compound to the surface of a polymeric film or other delivery vehicle capable of transferring a controlled amount of the compound to a foodstuff surface.

In an alternative embodiment, the method is carried out by delivering the compound through non-toxic polymer delivery system which is then applied to the surface of the foodstuff so that the rate of compound delivery may be controlled.

Foodstuff includes any non-toxic edible product such as meat, fish, vegetables which may be raw or cooked, canned, frozen, dehydrated, milk including powdered milk, dehydrated meat and vegetable stocks, herbs, spices any combination thereof including sauces, gravies, mixes and the like. Foodstuff may also include products such as animal feed, medicines, and other substances which may be ingested.

The present inventive process provides effective antimicrobial activity without detrimentally affecting the taste, texture, color, odor or appearance of the foodstuff. Furthermore, the present process does not pose harmful toxicology or environmental problems.

The process is particularly advantageous to inhibit microbial growth on ground meats and powdered dairy products. In the case of ground meat, the option of a non-aqueous delivery vehicle means that the compound will remain on the surface of the meat instead of being absorbed by the meat. Additionally, the compound may also be mixed with the ground meat to prevent microbial growth below the surface. Furthermore, the compound may also be applied to the foodstuff before grinding or dehydrated to further inhibit microbial activity. This particularly advantageous in ground meats because there may be E. coli activity inside the meat as well as on the surface of the meat.

This is a particular issue with ground meat as the large surface area and a non-planar surface makes it difficult to coat the surface with aqueous prior art compounds which will eventually be absorbed by the meat. The rate of absorption will be slowed by a non-aqueous delivery vehicle. On the other hand a non-aqueous delivery vehicle is necessary for powdered milk where an aqueous delivery vehicle is would alter the properties of the powdered milk.

These and other features of the invention will be more readily understood in view of the following detailed description.

DETAILED DESCRIPTION

The present invention is a process to reduce the microbial contamination of foodstuffs. It is particularly advantageous when used in ground meat and in powdered dairy products. When the compound includes an anionic surfactant, it is effective against both gram-negative and gram-positive bacteria but does not change or alter the taste, texture, color, odor or appearance of the poultry.

U.S. Pat. No. 5,434,182 incorporated by reference, discloses the antimicrobial agents used in the inventive method. The inventors discovered a method for preventing or treating a bacterial condition in a warm blooded animal. The patent also disclosed the use of fatty acids and monoglycerides in liquid milk as an antimicrobial agent. U.S. Pat. No. 5,434, 182 also disclosed that short-chain and long-chain saturated fatty acids had no or a very small antiviral effect at the highest concentrations tested. Medium-chain saturated and long-chain unsaturated fatty acids, on the other hand, were all highly active against the enveloped viruses, although the fatty acid concentration required for maximum viral inactivation varied by as much as 20-fold. Monoglycerides of these fatty acids were also highly antiviral, in some instances at a concentration 10 times lower than that of the free fatty acids. Antiviral fatty acids were found to affect the viral envelope, causing leakage and at higher concentrations, a complete disintegration of the envelope and the viral particles. They also caused disintegration of the plasma membranes of tissue culture cells resulting in cell lysis and death. The same phenomenon occurred in cell cultures incubated with stored antiviral human milk. The inventors have now discovered that these compounds may be applied to the surface of a foodstuff to inhibit microbial activity.

In the present application, certain terms are defined as follows:

Antimicrobially Effective Amount(s) means that amounts of components in a compound, as a whole, provides an antimicrobial activity having a spectrum of sufficient breadth to kill essentially most pathogenic or undesired bacteria such as bacteria known to cause or associated with food poisoning in humans or related to or associated with food spoilage or reduce the number of such bacteria to an acceptable level. Those of ordinary skill in the art will readily determine when the compound of the present invention provides synergistic antimicrobial activity using assay and bacterial screening methods well known in the art.

One readily performed assay involves exposing selected known or readily available viable bacterial strains, such as *Escherichia coli*, Staphylococcus spp., Streptococcus spp., Pseudomonas spp., or Salmonella spp., to a test compound at a predetermined bacterial concentration in a culture media at an appropriate temperature. After a sufficient contact time, an aliquot of a sample containing the exposed bacteria is collected, diluted, and plated out on agar. The plated sample of bacteria is incubated for about forty-eight hours and the number of viable bacterial colonies growing on the plate is counted. Once colonies have been counted the reduction in the number of bacteria caused by the test compound is readily determined. Bacterial reduction is generally reported as $\log_{10}$ reduction determined by the difference between the $\log_{10}$ of the initial inoculum count and the $\log_{10}$ of the inoculum count after exposure. Other assay methods are known to those skilled in the art.

Shelf-Life means a period of time it takes for a processed food to spoil. For example, poultry is considered to be spoiled if the bacterial count for an area of skin (one square centimeter) is equal to or greater than 10<7> C.F.U/cm<2> (colony forming units per square centimeter). Standards to determine spoilage are well-known to those in a foodstuff industry.

The preservation of moisture-containing foods such as grounds meat from the antimicrobial compound may be dependent upon a variety of factors and mechanisms whose interaction is not always fully understood. However, some basic mechanisms are generally well accepted, and can be discussed at this point to aid in understanding the invention.

Microbial growth is largely dependent upon the amount of moisture in a system available as a growth medium. The typical expression of this is the water activity, $A_w$, of a product. The $A_w$ is equal to the vapor pressure of water in the system divided by the vapor pressure of pure water at the same temperature. Theoretically, the $A_w$ of a given system can be lowered to such a degree that the water is not sufficiently available to support any microbial growth. However, this would alter the taste and texture to an undesirable level. Therefore, as a practical matter, it is not possible as a practical matter to obtain these low $A_w$ values. Where the $A_w$ of the system is not lowered to the absolute point below which organisms will not grow, antimicrobials are also added. Typically, these antimicrobial agents are added to control mold growth which is not sufficiently retarded at the $A_w$ values involved.

Lastly, the provisions of an acid medium of sufficiently low pH will aid in preventing microbial activity owing to the fact that many organisms cannot survive in such an environment. However, since the requisite pH for achieving this protection is generally so low as to result in an unpalatable, as well as detrimental system in some cases, the utilization of pH as a primary protective is rarely employed.

The present inventive process surprisingly is able to prolong food shelf life by preventing food spoilage for a longer period of time without altering the taste, texture or other organoleptic properties of the foods. This is due to many factors including its non-aqueous form.

The compounds used can be selected from the group consisting of saturated or unsaturated fatty acids having from 4 to 22 carbon atoms, esters or ethers of glycerol with said acids, and saturated or unsaturated fatty alcohols having from 4 to 22 carbon atoms, especially from 6 to 14 carbon atoms. Preferred compounds comprise saturated fatty acids having from 4 to 14 carbon atoms, particularly from 6 to 14 carbon atoms, and monoglycerides thereof, and saturated fatty alcohols having from 6 to 14 carbon atoms. Especially preferred are $C_7$–$C_{12}$ fatty acid monoglycerides, either singly or in mixtures thereof. Also useful according to the invention are mono- or polyunsaturated fatty acids having from 14 to 22 carbon atoms, especially from 16 to 20 or from 16 to 18 carbon atoms, and the monoglycerides thereof, and mono- or polyunsaturated fatty alcohols having from 14 to 22 or 16 to 20 carbon atoms. The above-mentioned ranges of carbon atoms are inclusive of fatty acids having odd numbered carbon atoms.

It is also within the scope of the invention to employ ether and/or lysophosphatidylcholine derivatives of $C_4$–$C_{22}$ fatty acids having antimicrobial, especially antiviral and/or antibacterial, activity. For example, useful fatty acid derivatives would have an ether bond between a fatty acid and glycerol. Examples of such compounds include 1-O-decyl-sn-glycerol, 1-O-lauryl-sn-glycerol, 1-O-octyl-sn-glycerol, and 1-O-oleyl-sn-glycerol. Useful lysophosphatidylcholine derivatives include, for example, L-α-lysophosphatidylcholine caproyl, L-α-lysophosphatidylcholine decanoyl, and L-α-lysophosphatidycholine lauroyl.

The compounds used in the inventive method have antimicrobial, especially antiviral and/or antibacterial, activity. Microorganisms that can be killed according to the inventive method include, but are not limited to, the following fungi, yeast, and viruses:

| | Fungi |
|---|---|
| Ringworm: | Dermatophytes |
| | Black piedra |
| | White piedra |
| | *Tines nigra* |
| | Tines versicolor |
| | Yeast |
| Yeast: | *Candida albicans* |
| | Viruses |
| Togaviridae family: | |
| Alphavirus (arbovirus group A) | mosquito-borne viruses |
| Flavivirus (arbovirus group B) | mosquito-borne viruses |
| | tick-borne viruses |
| Rubivirus | Rubella virus |
| Pestivirus | viruses of cattle and pigs |
| Orthomyxoviridae: | Influenza virus A |
| | Influenza virus B |
| | Influenza virus C |
| Paramyxoviridae: | Parainfluenza virus |
| | Mumps virus |
| | Newcastle disease virus |
| | Viruses of rinderpest and canine distemper virus |
| | respiratory synoytial virus |
| | rabies viruses |
| Retroviridae: | sarcoma and leukemia viruses |
| | visna virus |
| | human immuno deficiency viruses (HIV) |
| | human lymphotropic viruses Types 1 and 2 |
| Herpesviridae: | Herpes simplex types 1 and 2 |
| | *varicella zoster* |
| | cytomegalovirus |
| | Epstein-Barr virus |
| | All other members of this group |

The above compounds may include additives such as binding agents, emulsifiers, transfer aids or other additives such as colorants and flavorants e.g. gaseous or liquid smoke. These agents may or may not enhance the antimicrobial effect of the agent. The compound may be mixed with an aqueous non-aqueous vehicle as desired. In an alternative embodiment, the compound may be mixed with foodstuff to prevent microbial activity in a foodstuff.

The following examples are intended to provide further details and embodiments related to the practice of the present invention. These examples are provided for illustrative purposes and should not be construed to limit the scope of the present invention which is defined in the appended claims.

The present invention may be used in a foodstuff processing plant in a variety of suitable ways during various stages of the process. For example, the present compound may be applied to the surface of the foodstuff as a spray, a rinse, or a wash solution. In addition, the present invention has a wide useful temperature range which allows the compound to be used at different stages in the process plant. For example, the compound may be used both in the scald tank as well as in the chill tank.

The foodstuff surface will be contacted with the treatment solution for a period of time sufficient to prevent, remove, retard, or reduce microbial contamination and/or growth. Treatment should be completed so that an antimicrobially effective amount of the compound is left on the surface and if needed the interior of the foodstuff to prevent retard or prevent microbial activity for a sufficient period of time.

In the case of meat products, the treatment may be conducted during slaughter either prior to or after chilling by dipping or preferably spraying the compound onto the surfaces of the carcasses for several minutes.

When the compound is used in ground meat, surfactants may be added so that the texture of the food is further preserved. Suitable anionic surfactants as well as nonionic surfactants include dioctyl sodium sulfosuccinate, sodium lauryl sulfate and polyoxyalkylene derivatives of propylene glycol. Various surfactants are also reported in EPO 0 243 145 and EPO 0 244 144. Preferably, food grade and/or GRAS materials are used in amounts which provide a concentrated compound of between about 1.0–30.0 wt. % and preferably about 4.0–12.0 wt. %. When used, the concentrate may be diluted with water to provide a surfactant concentration of between about 0.001–1.0 wt. % and preferably 0.01–0.5 wt. %.

Some exemplary surfactants and proportions are listed below:

| COMPONENT | WT. % |
|---|---|
| glycerol monolaurate<br>Lauricidin Inc.<br>Okemos, MI | 1.0 |
| propylene glycol monocaprylate<br>Karlshamns<br>Columbus, OH | 2.5 |
| propylene glycol monocaprate<br>Karlshamns<br>Columbus, OH | 2.5 |
| lactic acid<br>R.I.T.A. Corp.<br>Woodstock, IL | 6.0 |
| PLURONIC F-68 surfactant<br>BASF<br>Parsippany, NJ | 10.0 |
| propylene glycol<br>J. T. Baker, Inc.<br>Phillipsburg, NJ | 15.0 |
| dioctyl sodium sulfosuccinate<br>(50 wt. % in ethanol)<br>American Cyanamid<br>Wayne, NJ | 10.0 |
| deionized water | 53.0 |

A discussion of the use of surfactants for this purpose may be found in U.S. Pat. No. 5,490,992, incorporated by reference. The compound of the present invention may be prepared by combining the above described components using processes and procedures well known to those of ordinary skill in the art.

The inventive process may also be practiced by applying the compound to the surface of a foodstuff by means of a polymeric film. The film may be used to wrap the foodstuff. The compound may also be applied to the paper used to line a food container or the container or food packaging itself. In the alternative, the compound may be applied to the polymeric material which can be used as an applicator of the compound to inhibit microbial growth. A discussion of films suitable for use in conjunction with the inventive process is discussed in U.S. Pat. No. 5,573,801, herein incorporated by reference.

Food packaging films suitable for use in the present invention include polymeric films such as blown film, oriented film, stretch and shrink film, heat shrinkable bags and food casings. “Food packaging films” as that term is used herein are flexible sheet materials which are suitably 15 mils or less and preferably less than 10 mils (25 microns) in thickness.

Suitable films include regenerated cellulose and thermoplastic stretch or shrink films, and may be monolayer or multilayer films. Shrink films are preferably formed into heat shrinkable, biaxially-oriented bags.

Suitable films include food casings which are generally flexible films which are preferably tubular and may be formed of polymeric materials including cellulosic materials such as regenerated cellulose or cellulose carbamate or of plastics such as homopolymers or copolymers of polyolefins e.g. polypropylene, polyethylene, or polyamides, polyethylene terphthalate, polyvinylidene chloride copolymers or ethylene-vinyl acetate copolymers or of proteinaceous films such as collagen. For example, casings are tubular cellulosic casings, that are prepared by any one of the methods well known in the art. Such casings are generally flexible, thin-walled seamless tubing which is preferably formed of regenerated cellulose, and the like, in a variety of diameters. Also suitable are tubular cellulosic casings having a fibrous reinforcing web embedded in the wall thereof. Casings having a reinforcing web are commonly called "fibrous food casings", whereas cellulosic casings without the fibrous reinforcement, are herein referred to as "non-fibrous" cellulosic casings. Both natural and synthetic casings are contemplated by the present invention.

In the present invention the compound may be applied to the outer surface of a film such as a tubular casing by passing the casing through a bath of a solution containing the compound and/or additives. The compound may be allowed to soak into the casing prior to doctoring off any excess liquid by passing the casing through squeeze rolls or wipers, and the like, for an amount of time sufficient for the casing to incorporate the desired amount of agent and additives. The process of passing the casing through a treatment bath, (which may also be referred to as a "dip bath" or a "dip tank,") may also be referred to as a "dipping" step. The additives may alternatively be externally applied to the casing by methods other than dipping, such as spraying, brushing, roll-coating, printing and the like. Alternatively, the compound or additives may be applied to the internal surface of a film tube such as a casing by any of several well-known procedures described in U.S. Pat. No. 4,171,381 to Chiu, the disclosure of which is incorporated by reference. These include slugging or bubble coating, spraying, and coating while shirring.

Transfer of the compound from the inner surface of a film in direct contact with a contiguous foodstuff surface, according to one embodiment of the invention, is such that the compound is at least in part permanently transferred to the foodstuff during processing thereof in an amount sufficient to be effective to kill or inhibit growth of microorganisms on the foodstuff surface notwithstanding subsequent peeling and removal of the casing.

The inventive process may be also be carried by using the entire foodstuff packaging as a vehicle. For example, ground meat is typically sold in the stores contained in a Styrofoam tray, which has an absorbent paper material lining the tray to absorb juices, and a plastic film wrapped around the meat. The inventive process may be practiced by applying the compound to the surface of the meat, admixing the compound with the meat, applying the compound to the interior of the plastic film used to wrap the meat, applying the compound to the interior of the Styrofoam packaging used to wrap the meat, and applying the compound to the paper used to absorb the juices.

The invention also contemplates encapsulating the compound into polymer capsules which would release the compound over time on to the surface of the foodstuff, thereby increasing its shelf life. Preferably, the size and composition of the capsules would not alter the taste, or texture of the foodstuff. Any non-toxic polymer could be used.

The above examples are exemplary and should not be taken as limiting the invention. The invention is applicable to any foodstuff particularly those which may benefit from application of an antimicrobial agent to its surface. It is contemplated that the compounds, films and methods of the invention have applicability to both animal-derived and plant-derived foodstuffs including but not limited to foodstuffs of all types (such as beef, pork, chicken, turkey, fish, etc.) primal and sub-primal cuts of meat, luncheon meats, hams, lamb, steak, hamburger, and poultry including chicken, turkey, duck, goose, as well as fish, and dairy products such as semi-soft and hard cheeses, processed cheese, powdered milk and vegetable products including lettuce, tofu, coleslaw, soybean derived protein substitutes for meat, etc. The film may also be used for packaging other processed foods such as dehydrated gravy mixes, soup mixes, and dried spices. The non-aqueous nature of the compound insures that it will not alter the taste, texture or appearance of the foodstuff.

Other agents such as binding agents, buffers and emulsifiers, may be added to enhance the antimicrobial effect of the compound or assist transfer from the packaging film to the foodstuff. The compound may also contain other antimicrobial agents or other additives such as colorants or flavorants.

The preceding specific embodiments are illustrative of the practice of the inventive method. It is to be understood, however, that other expedients known to those skilled in the art or disclosed herein may be employed without departing from the spirit of the invention or the scope of the appended claims.

We claim:

1. A process for inhibiting microbial growth on a surface of an edible foodstuff which comprises applying to the surface an antimicrobially effective quantity of a compound selected from the group consisting of $C_4$–$C_{24}$ fatty acids and monoglycerides thereof, $C_6$–$C_{14}$ fatty alcohols, $C_{14}$–$C_{22}$ mono- or polyunsaturated fatty acids and monoglycerides thereof, $C_{16}$–$C_{20}$ mono- or polyunsaturated fatty alcohols, and ether and lysophosphatidylcholine derivatives of $C_4$–$C_{22}$ fatty acids.

2. A process according to claim 1 wherein the compound is in a powdered form.

3. A process according to claim 1 wherein the foodstuff in selected from the group consisting of ground meat, powdered milk, powdered soup mixes, spices, dried meats, dried fruits and powdered gravy mixes.

4. A process according to claim 1 wherein the compound is applied to the surface of the foodstuff by contacting the surface of the foodstuff with a surface of a polymeric film having the compound on the surface to transfer an antimicrobially effective amount of the compound to the surface of the foodstuff.

5. A process according to claim 1 wherein the compound is a contained within a delivery system comprising a non-toxic polymer and the compound is released over a period of time on to the surface of a foodstuff to prevent microbial activity on the surface of the foodstuff after removal of the film for the normal shelf life of the foodstuff.

6. A film for inhibiting microbial growth on a surface of an edible foodstuff which comprises
   a) a polymer film having two surfaces
   b) an antimicrobially effective quantity of a compound selected from the group consisting of $C_4$–$C_{24}$ fatty acids and monoglycerides thereof, $C_6$–$C_{14}$ fatty alcohols, $C_{14}$–$C_{22}$ mono- or polyunsaturated fatty acids and monoglycerides thereof, $C_{16}$–$C_{20}$ mono- or polyunsaturated fatty alcohols, and ether and lysophosphatidylcholine derivatives of $C_4$–$C_{22}$ fatty acids applied to at least one of the surfaces of the polymer.

7. A film for inhibiting microbial growth on a surface of an edible foodstuff according to claim 6 further comprising a transfer agent for the compound whereby an antimicrobially effective amount of the compound is transferred to the surface of the foodstuff when contacted with the film to prevent microbial activity on the surface of the foodstuff after removal of the film for the normal shelf life of the foodstuff.

8. A process for inhibiting microbial growth on a surface of an edible foodstuff according to claim 1 wherein the compound further comprises a surfactant.

9. A process for inhibiting microbial growth on a surface of an edible foodstuff according to claim 1 wherein the compound further comprises a binding agent.

10. A process for inhibiting microbial growth on a surface of an edible foodstuff according to claim 1 wherein the compound further comprises an emulsifier.

11. A process for inhibiting microbial growth on a surface of or in an edible foodstuff which comprises admixing an antimicrobially effective quantity of a compound selected from the group consisting of $C_4$–$C_{24}$ fatty acids and monoglycerides thereof, $C_6$–$C_{14}$ fatty alcohols, $C_{14}$–$C_{22}$ mono- or polyunsaturated fatty acids and monoglycerides thereof, $C_{16}$–$C_{20}$ mono- or polyunsaturated fatty alcohols, and ether and lysophos-phatidylcholine derivatives of $C_4$–$C_{22}$ fatty acids with the foodstuff.

12. A paper for inhibiting microbial growth on a surface of an edible foodstuff which comprises c) a polymer film having two surfaces d) an antimicrobially effective quantity of a compound selected from the group consisting of $C_4$–$C_{24}$ fatty acids and monoglycerides thereof, $C_6$–$C_{14}$ fatty alcohols, $C_{14}$–$C_{22}$ mono- or polyunsaturated fatty acids and monoglycerides thereof, $C_{16}$–$C_{20}$ mono- or polyunsaturated fatty alcohols, and ether and lysophosphatidylcholine derivatives of $C_4$–$C_{22}$ fatty acids applied to at least one of the surfaces of the polymer film.

13. A paper for inhibiting microbial growth on a surface of an edible foodstuff according to claim 12 further comprising a transfer agent for the compound whereby an antimicrobially effective amount of the compound is transferred to the surface of the foodstuff when contacted with the paper to prevent microbial activity on the surface of the foodstuff after removal of the paper for the normal shelf life of the foodstuff.

14. A packaging for inhibiting microbial growth on a surface of or in an edible foodstuff which comprises e) a polymer packaging having two surfaces f) an antimicrobially effective quantity of a compound selected from the group consisting of $C_4$–$C_{24}$ fatty acids and monoglycerides thereof, $C_6$–$C_{14}$ fatty alcohols, $C_{14}$–$C_{22}$ mono- or polyunsaturated fatty acids and monoglycerides thereof, $C_{16}$–$C_{20}$ mono- or polyunsaturated fatty alcohols, and ether and lysophosphatidylcholine derivatives of $C_4$–$C_{22}$ fatty acids applied to at least one of the surfaces of the polymer.

15. A packaging for inhibiting microbial growth on a surface of an edible foodstuff according to claim 14 further comprising a transfer agent for the compound whereby an antimicrobially effective amount of the compound is transferred to the surface of the foodstuff when contacted with the packaging to prevent microbial activity on the surface of the foodstuff after removal of the packaging for the normal shelf life of the foodstuff.

16. A process for inhibiting microbial growth on a surface of or in an edible foodstuff according to claim 1 wherein the edible foodstuff is animal feed.

17. A process for inhibiting microbial growth on a surface of an edible foodstuff according to claim 1 wherein the edible foodstuff is an egg.

* * * * *